US009354560B2

(12) United States Patent
Imaizumi

(10) Patent No.: US 9,354,560 B2
(45) Date of Patent: May 31, 2016

(54) DRIVE TRANSMISSION DEVICE AND IMAGE FORMING APPARATUS

(71) Applicant: CANON KABUSHIKI KAISHA, Tokyo (JP)

(72) Inventor: Chikara Imaizumi, Numazu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/606,602

(22) Filed: Jan. 27, 2015

(65) Prior Publication Data

US 2015/0212456 A1 Jul. 30, 2015

(30) Foreign Application Priority Data

Jan. 28, 2014 (JP) ................................ 2014-013088

(51) Int. Cl.
*G03G 15/00* (2006.01)
*G03G 15/20* (2006.01)
(Continued)

(52) U.S. Cl.
CPC ............ *G03G 15/1615* (2013.01); *B65H 5/062* (2013.01); *B65H 29/125* (2013.01); *G03G 21/1647* (2013.01); *B65H 2403/42* (2013.01); *B65H 2403/47* (2013.01); *B65H 2403/721* (2013.01); *B65H 2403/942* (2013.01); *B65H 2404/1441* (2013.01); *B65H 2511/224* (2013.01); *B65H 2511/51* (2013.01); *B65H 2511/515* (2013.01); *B65H 2511/528* (2013.01); *B65H 2601/11* (2013.01); *G03G 15/2032* (2013.01); *G03G 15/2053* (2013.01); *G03G 15/70* (2013.01); *G03G 2221/1657* (2013.01); *Y10T 74/19079* (2015.01)

(58) Field of Classification Search
CPC .......... G03G 15/2032; G03G 15/2053; G03G 15/2035; G03G 21/1647; G03G 2221/1657; G03G 15/1615; B65H 5/06; B65H 29/125; B65H 5/062; Y10T 74/19079; Y10T 74/19074
USPC ...................... 399/308, 328, 21, 124; 74/665
See application file for complete search history.

(56) References Cited

U.S. PATENT DOCUMENTS 3,563,353 A * 2/1971 LoPresti ................ F16D 11/10
188/83
6,019,363 A 2/2000 Ahn
(Continued)

FOREIGN PATENT DOCUMENTS

JP H5-1050 U 1/1993
JP H6-118784 A 4/1994
(Continued)

*Primary Examiner* — Sophia S Chen
(74) *Attorney, Agent, or Firm* — Fitzpatrick, Cella, Harper & Scinto

(57) ABSTRACT

A drive transmission device includes: a first output gear and a second output gear which are rotatable about the same rotational axis; and a single intermediary member to be rotated about the rotational axis by a driving source. The intermediary member is provided between the first output gear and the second output gear with respect to an axial direction of the rotational axis. The intermediary member moves in a first axial direction of the rotational axis to rotate in engagement with the first output gear when the driving source rotates in a first direction, and moves in a second axial direction of the rotational axis opposite to the first axial direction to rotate in engagement with the second output gear when the driving source rotates in a second direction opposite to the first direction.

17 Claims, 9 Drawing Sheets

(51) Int. Cl.

| | |
|---|---|
| ***B65H 5/06*** | (2006.01) |
| ***G03G 15/16*** | (2006.01) |
| ***G03G 21/16*** | (2006.01) |
| ***B65H 29/12*** | (2006.01) |

(56) References Cited

U.S. PATENT DOCUMENTS

| | | | | |
|---|---|---|---|---|
| 6,626,751 | B1 | 9/2003 | Umeda | |
| 7,669,496 | B2 | 3/2010 | Takahashi | |
| 2009/0185830 | A1* | 7/2009 | Kim | G03G 21/0058 399/222 |
| 2014/0140745 | A1* | 5/2014 | Choi | F16D 41/22 399/381 |

FOREIGN PATENT DOCUMENTS

| | | | |
|---|---|---|---|
| JP | 10-72139 | A | 3/1998 |
| JP | 2001-132815 | A | 5/2001 |
| JP | 2006-308007 | A | 11/2006 |
| JP | 2007-120758 | A | 5/2007 |
| JP | 2008-70787 | A | 3/2008 |
| JP | 2010-48299 | A | 3/2010 |

* cited by examiner

DRIVE TRANSMISSION DEVICE AND IMAGE FORMING APPARATUS

FIELD OF THE INVENTION AND RELATED ART

The present invention relates to a drive transmission device for selectively transmit and interrupt drive from a driving source to driven portion, and an image forming apparatus using the drive transmission device.

In the image forming apparatus such as a printer, a facsimile machine or a copying machine or a composite image forming apparatus having a combination thereof, a single member is used as the driving source in order to reduce a size or a cost of the apparatus. By the single motor, a plurality of driven devices such as a feeding roller and a developing sleeve are driven.

In the case where the plurality of driven devices are driven by the single motor in the image forming apparatus, there is a need to selectively drive the plurality of driven devices. Therefore, a clutch device is provided between each drive device and the motor, so that ON and OFF of driving force transmission of the motor are switched by the clutch device.

In the case where an electromagnetic clutch is used as the clutch device, the electromagnetic clutch and an electrical part for driving and controlling the electromagnetic clutch are needed, so that an increase in size and cost of the device is caused.

Japanese Laid-Open Patent Application (JP-A) Hei 06-118784 discloses that a one-way clutch is provided in a drive transmission path from the single motor to two driven devices and the member is rotated in a normal direction and a reverse direction to selectively drive two driven devices. In JP-A Hei 06-118784, a shaft of a gear for transmitting drive from a driving unit to an image forming unit which are provided in a main assembly of the image forming apparatus is held by the one-way clutch.

JP-A 2008-070787 discloses that as means for selectively drive two driven devices by normal and reverse rotations of a single motor, one-way mechanisms which are independent of each other are provided.

On the other hand, in the image forming apparatus or composite image forming apparatus described above, a print is made on a recording material such as thick paper or glossy paper on which a toner is not readily fixed. At that time, in general, the number of rotation of the motor is decreased to, e.g., ½ or ⅓ of that in a normal operation to lower a feeding speed of the recording material depending on a species of the recording material, and then the toner image is fixed.

However, in the case where the single motor is used a different numbers of rotation depending on the species of the recording material, in all of speed ranges, there is a need to satisfy a torque, vibration, a durability and the like, so that there is a need to use an expensive motor.

JP-A Hei 10-072139 discloses a constitution using a swing gear for swinging between two gears as a means for reducing the number of rotation of the motor by changing a gear ratio of a driven portion of a copying machine through normal and reverse rotations of the motor.

However, with respect to the one-way clutch described in JP-A Hei 6-118784, the number of parts is large and a structure is complicated, and a small-sized one-way clutch is particularly expensive.

In the image forming apparatus, an occupied space of the drive transmission path from the motor to the driven device is limited, and the image forming apparatus is mass-produced, and therefore the drive transmission path is required to permit one-directional transmission of rotational drive with reliability while decreasing the number of parts and having a simple structure.

In the case where the independent one-way mechanisms are provided as described in JP-A 2008-070787, the device is upsized, and the number of parts is increased and therefore the structure is complicated, so that each of individual parts is required to have high accuracy.

Further, also in a state in which drive connection of a ratchet tooth is released (eliminated), a distance cannot be increased to a length of not less than a tooth top of the ratchet tooth, so that noise of collision between the tooth tops of the ratchet teeth generates.

In the case where the swing gear described in JP-A Hei 10-072139 is used, the device is upsized, so that there arises a problem of falling and strength of the swing gear at a supporting portion during a high torque.

SUMMARY OF THE INVENTION

The present invention has solved the above described problems. A principal object of the present invention is to provide a drive transmission device which has a small number of parts and a simple structure and which is capable of selectively transmitting and interrupting drive (driving force) to a driven portion.

According to an aspect of the present invention, there is provided a drive transmission device comprising: a first output gear and a second output gear which are rotatable about the same rotational axis; and a single intermediary member to be rotated about the rotational axis by a driving source, wherein the intermediary member is provided between the first output gear and the second output gear with respect to an axial direction of the rotational axis, and wherein the intermediary member moves in a first axial direction of the rotational axis to rotate in engagement with the first output gear when the driving source rotates in a first direction, and moves in a second axial direction of the rotational axis opposite to the first axial direction to rotate in engagement with the second output gear when the driving source rotates in a second direction opposite to the first direction.

These and other objects, features and advantages of the present invention will become more apparent upon a consideration of the following description of the preferred embodiments of the present invention taken in conjunction with the accompanying drawings.

DESCRIPTION OF THE EMBODIMENTS

Embodiments of an image forming apparatus including a drive transmission device according to the present invention will be described specifically with reference to the drawings.

Embodiment 1

Figure 1:
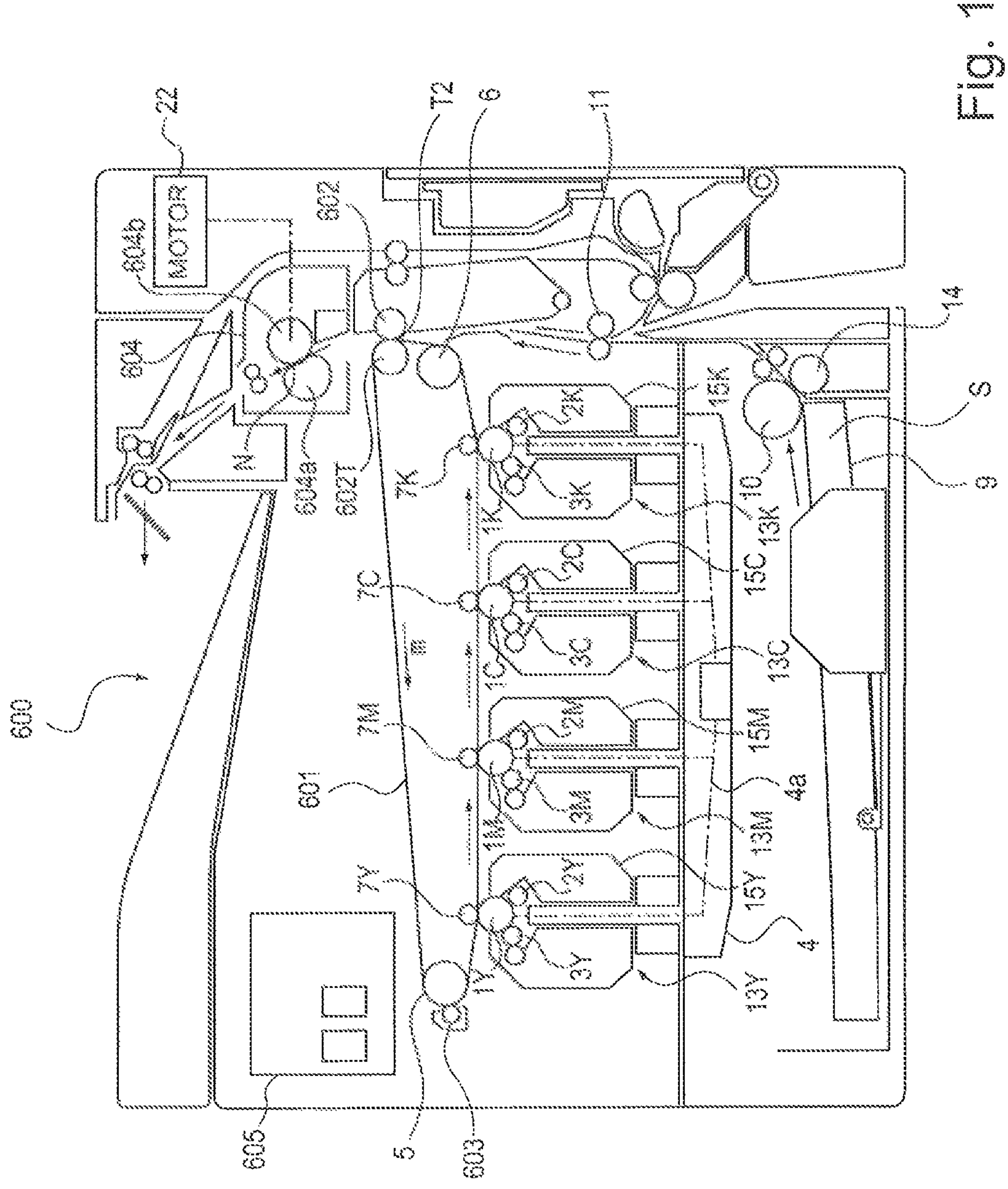
FIG. 1 is a sectional illustration showing a structure of an image forming apparatus including a drive transmission device according to the present invention.
Figure 2:
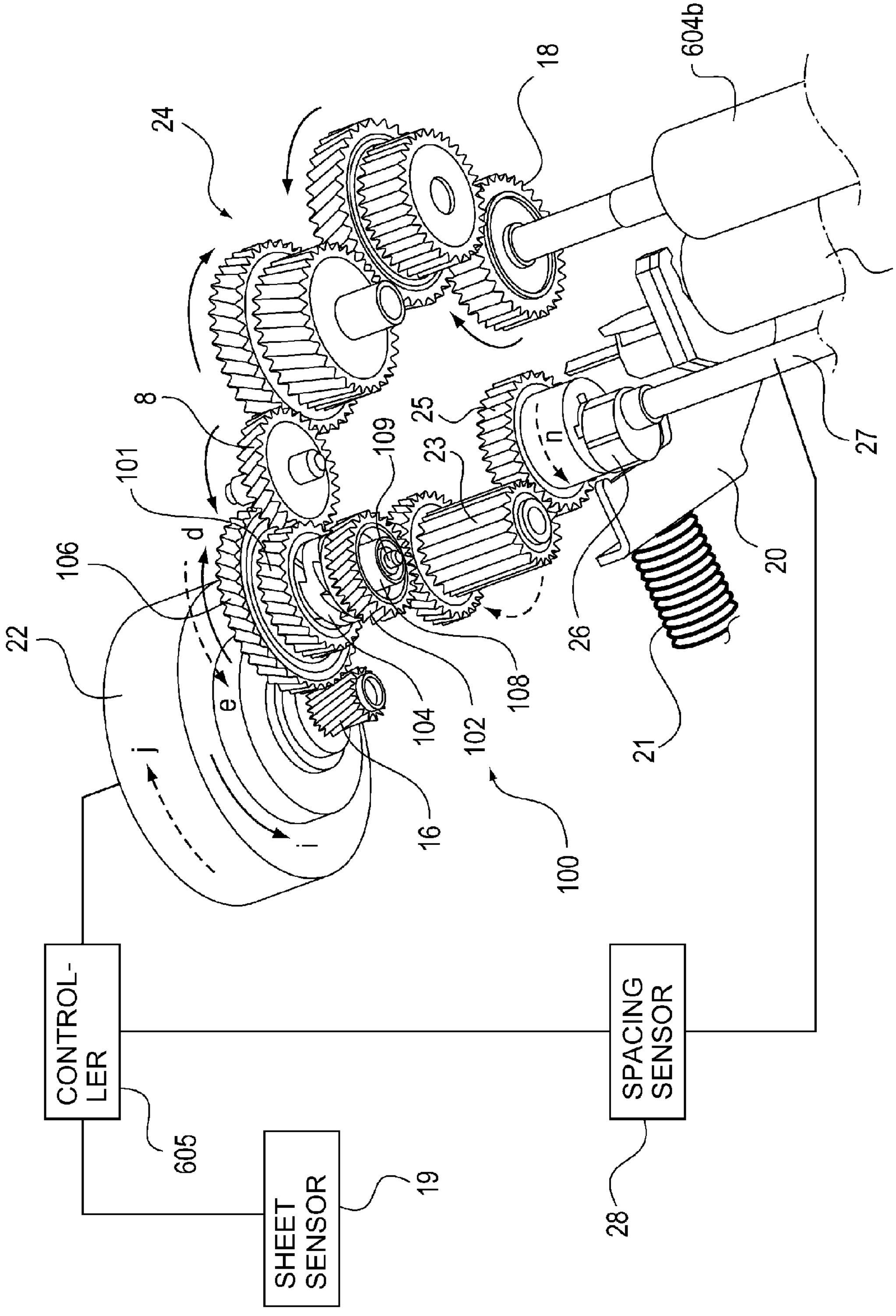
FIG. 2 is a perspective illustration showing a structure of the drive transmission device according to the present invention in Embodiment 1.

First, a structure of the image forming apparatus including the drive transmission device according to the present invention in this embodiment will be described with reference to FIGS. 1 to 9. FIG. 1 is a sectional illustration showing the structure of the image forming apparatus including the drive transmission device according to the present invention. FIG. 2 is a perspective illustration showing a structure of the drive transmission device according to the present invention.

<Image Forming Apparatus>

As shown in FIGS. 1 and 2, an image forming apparatus 600 includes image forming portions 13Y, 13M, 13C and 13K for forming toner images of yellow (Y), magenta (M), cyan (C) and black (K), respectively. By the image forming portions 13Y, 13M, 13C and 13K, the toner images are formed on a sheet S as a recording material. In a fixing device 604 as a fixing means for fixing the toner images on the sheet S, a pressing roller 604*b* as a rotatable pressing member is provided.

A drive transmission device 100 in this embodiment effects rotational drive and non-drive by a driving force transmitted to a first output gear 101 by normal rotation of a single motor 22 as a driving source capable of rotating normally and reversely.

Further, a fixing pressure releasing cam 26 as a contact and separation (spacing) means for moving a fixing roller 604*a*, as a rotatable heating member provided in the fixing device 604, toward and away from the pressing roller 604*b* is provided. Rotational drive and non-drive of the fixing pressure releasing cam 26 are made by a driving force transmitted to a second output gear 102 by reverse rotation of the motor 22.

The drive transmission device 100 in this embodiment selectively switches the rotational drive of the pressing roller 604*b* as a driven means and a contact and separation operation between the fixing roller 604, and the pressing roller 604*b* by switching the normal rotation and the reverse rotation of the single motor 22.

As shown in FIG. 1, the image forming portions 13Y, 13M, 13C and 13K for forming the toner images of yellow (Y), magenta (M), cyan (C) and black (K) are disposed in the listed order from the left side toward the right side in a main assembly of the image forming apparatus 600. For convenience of explanation, description will be made simply using an image forming portion 13 as a representative of the image forming portions 13Y, 13M, 13C and 13K. This is true for other image forming means.

Each image forming portion 13 includes various electrophotographic process devices such as a photosensitive drum 1 (1Y, 1M, 1C, 1K) as an image bearing member to be rotationally driven in the clockwise direction in FIG. 1 at a predetermined speed, a charging roller 2 (2Y, 2M, 2C, 2K) as a charging means, a developing device 3 (3Y, 3M, 3C, 3K) as a developing means and a laser scanner 4 as an image exposure means.

The image forming portions 13 from the toner images of yellow (Y), magenta (M), cyan (C) and black (K) which are component colors of color-separated component images for a full-color toner image, on the surface of the photosensitive drums 1 at predetermined image forming timing. An image forming principle and an image forming process are well known and therefore will be omitted from specific description.

An intermediary transfer belt 601 provided in an upper side of the image forming portions 13 in FIG. 1 is rotatably stretched by a follower roller 5 provided in the image forming portion 13Y side, a driving roller 6 provided in the image forming portion 13K side and a secondary transfer opposite roller 602T provided above the driving roller 6. The intermediary transfer belt 601 is rotationally driven in an arrow in direction at the substantially same speed as the rotational speed of the photosensitive drums 1 of the image forming portions 13 by a driving force of the driving roller 6.

Outside the intermediary transfer belt 601, a secondary transfer roller 602 is provided opposed to the secondary transfer opposite roller 602T. The secondary transfer roller 602 is contacted to the intermediary transfer belt 601 toward the secondary transfer opposite roller 602T at a predetermined urging force. As a result, a secondary transfer nip T2 is formed by the intermediary transfer belt 601 and the secondary transfer roller 602. The second transfer roller 602 is rotationally driven at the substantially same speed as the rotational speed of the intermediary transfer belt 601 in the same direction as the rotational direction of the intermediary transfer belt 601 indicated by the arrow m in FIG. 1.

In the fixing device 604, a press-contact roller pair consisting of the fixing roller 604*a* and the pressing roller 604*b* is rotationally driven at the same speed. The fixing roller 604*a* is heated by a heater incorporated therein to be temperature-controlled at a predetermined fixing temperature.

The image forming apparatus 600 is controlled by a controller 605 as a control means. The motor 22 is controlled by the controller 605 to be normally and reversely rotated. The controller 605 controls image forming devices and various driving portions of the image forming apparatus 600 to carry out a printing operation. The controller 605 controls the image forming devices of the image forming apparatus 600 on the basis of a print start signal.

First, the surface of the photosensitive drum 1 is electrically charged uniformly by the charging roller 2 and is exposed to laser light 4*a* emitted from the laser scanner 4 depending on image information, so that an electrostatic latent image is formed on the surface of the photosensitive drum 1. Then, a toner is supplied to the electrostatic latent image by the developing device 3, so that the toner image is formed.

On an inner peripheral surface of the intermediary transfer belt 601, primary transfer rollers 7Y, 7M, 7C and 7K as primary transfer means are provided opposed to the photosensitive drums 1. By a predetermined primary transfer bias (voltage) applied to the primary transfer rollers 7Y, 7M, 7C and 7K, (unfixed) toner images (mirror images) are successively primary-transferred superposedly from the surfaces of the photosensitive drums 1 onto an outer peripheral surface of the intermediary transfer belt 601. As a result, the transferred toner images are formed as a full-color toner image.

The toner remaining on the surfaces of the photosensitive drums 1 after the primary transfer is removed by cleaning devices 15Y, 15M, 15C and 15K as cleaning means, so that the surfaces of the photosensitive drums 1 are cleaned and then are subjected to repetitive image formation. The toner images primary-transferred on the outer peripheral surface of the intermediary transfer belt 601 are moved toward the secondary transfer nip portion T2 by the rotation of the intermediary transfer belt 601.

On the other hand, sheets stacked and accommodated in a feeding cassette 9 are fed by rotational drive of a feeding roller 10 and are separated and fed one by one by a retard roller 14. Then the sheet S passes through a feeding path to be fed to a registration roller pair 11. Thereafter, the sheet S is fed so that a leading end thereof reaches the secondary transfer nip portion T2 by the registration roller pair 11 when a leading end of the (unfixed) toner image formed on the intermediary transfer belt 601.

The sheet S fed to the secondary transfer nip portion T2 is nipped and fed through the secondary transfer nip portion T2. During the feeding, the toner images transferred on the outer peripheral surface of the intermediary transfer belt 601 are secondary-transferred electrostatically onto the sheet S by a predetermined secondary transfer bias (voltage) applied to the secondary transfer roller 602.

The sheet S passing through the secondary transfer nip portion T2 is curvature-separated from the outer peripheral surface of the intermediary transfer belt 601 and then is gradually fed toward the fixing device 604. The toner remaining on the outer peripheral surface of the intermediary transfer belt 601 after the sheet S is separated is removed by a cleaning device 603 as a cleaning means, and the surface of the intermediary transfer belt 601 is cleaned and then is subjected to repetitive image formation.

The sheet S fed from the secondary transfer nip portion T2 to the fixing device 604 is heated and pressed during the nipping and feeding through the fixing nip portion N where the fixing roller 604*a* and the pressing roller 604*b* are press-contacted to each other, so that the (unfixed) toner image is fixed on the sheet S.

<Drive Transmission Device>

Figure 3:
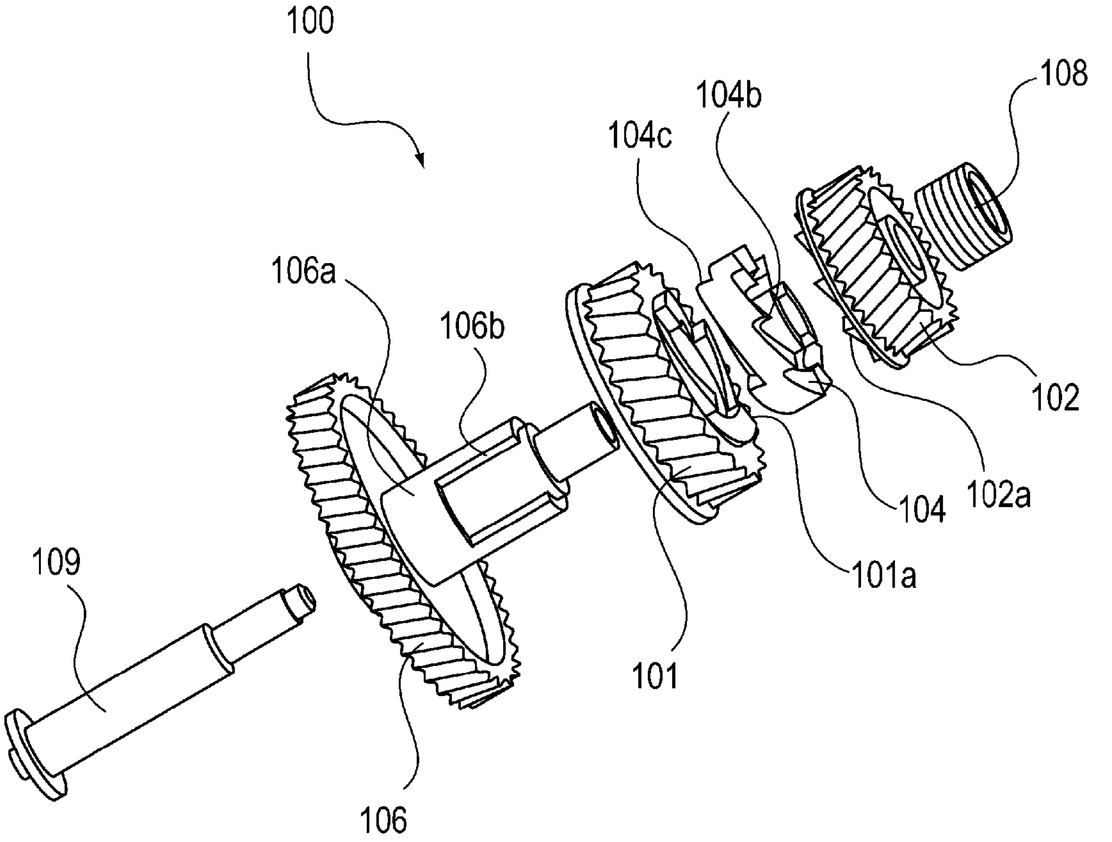
FIG. 3 is an exploded perspective view showing the structure of the drive transmission device in Embodiment 1.
Figure 4:
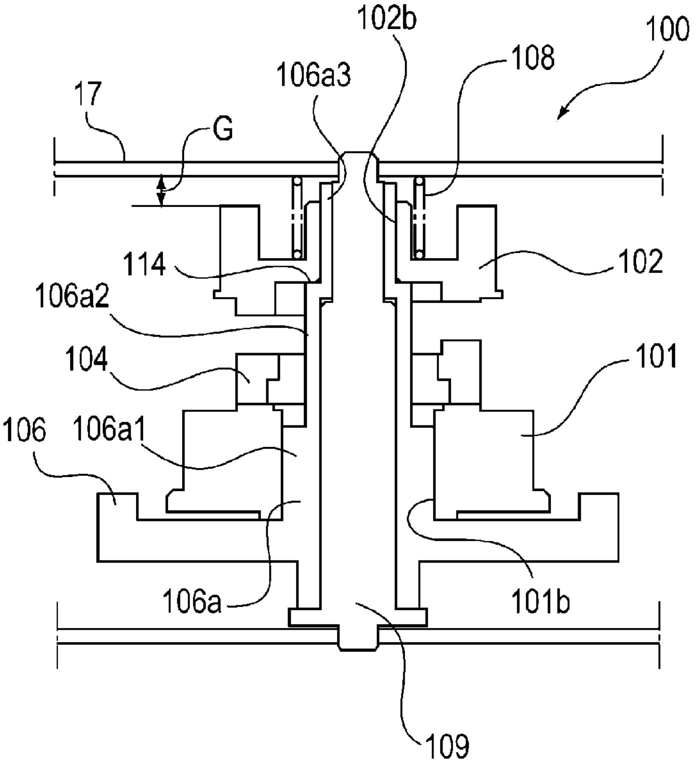
FIG. 4 is a sectional illustration showing the structure of the drive transmission device in Embodiment 1.
Figure 5:
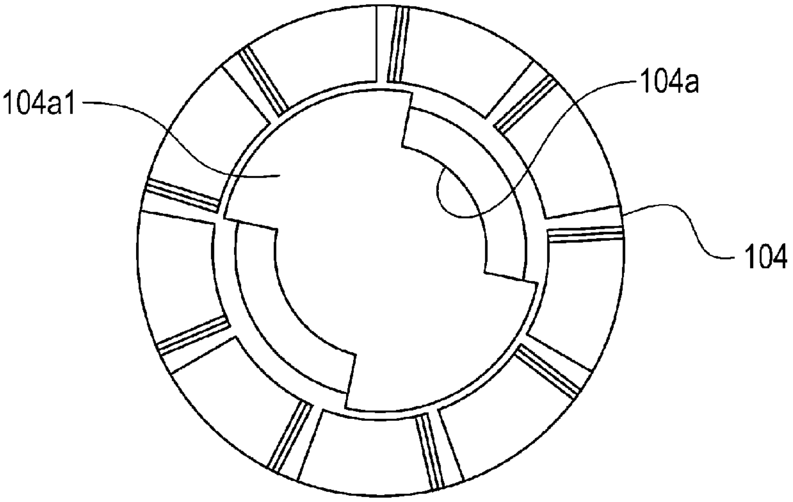
FIG. 5 is a plan illustration showing a structure of an intermediary member in Embodiment 1.

With reference to FIGS. 2 to 9, a structure of the drive transmission device 100 for selectively switching the rotational drive of the pressing roller 604*b* and the contact and separation operation between the fixing roller 604*a* and the pressing roller 604*b* by normal and reverse rotations of the single motor 22 will be described. FIGS. 2 and 3 are perspective illustration and an exploded perspective view, respectively, showing the structure of the drive transmission device 100. FIG. 4 is a sectional illustration showing the structure of the drive transmission device 100, and FIG. 5 is a plan illustration showing a structure of an intermediary member 104 rotatable about a supporting shaft 109 having an axis by receiving rotational drive from the motor 22 capable of rotating in normal and reverse directions.

As shown in FIGS. 2 to 4, the drive transmission device 100 includes an input gear 106 provided rotatably about the supporting shaft 109 shown in FIG. 4. The input gear 106 is provided in engagement with a driving gear 16 fixed on a driving shaft of the motor 22, and transmits the rotational drive from the motor 22 to the intermediary member 104. As shown in FIG. 3, at an outer peripheral surface of a ring portion 106*a* provided integrally with the input gear 106, a rib 106*b* is projected, and at a part of a through hole 104*a* provided at a central portion of the intermediary member 104 shown in FIG. 5, a groove portion 104*a*1 is formed correspondingly to the rib 106*b*.

The outer peripheral portion of the ring portion 106*a* provided to stand from a gear surface of the input gear 106 along an axial direction is inserted into the through hole 104*a* of the intermediary member 104. Then, the rib 106*b* projected at the outer peripheral surface of the ring portion 106*a* is engaged in and locked by the groove portion 104*a*1 provided at the part of the through hole 104*a* of the intermediary member 104.

As a result, the intermediary member 104 is engaged with the input gear 106 with respect to a rotational direction (circumferential direction of the supporting shaft 109), so that drive is transmitted. The intermediary member 104 is provided movably in the axial direction on the outer peripheral surface of the ring portion 106*a* of the input gear 106.

Around the supporting shaft 109, the outer peripheral portion of the ring portion 106*a* of the input gear 106 is inserted into the through hole 101*b* of the first output gear 101, so that the first output gear 101 is rotatably held. Further, around the supporting shaft 109, the outer peripheral portion of the ring portion 106*a* of the input gear 106 is inserted into the through hole 102*b* of the second gear 102, so that the second output gear 102 is rotatably held.

The first output gear 101 and the second output gear 102 are disposed coaxially with each other while sandwiching the intermediary member 104 therebetween. Further, the input gear 106, the first gear 101, the intermediary member 104 and the second output gear 102 are disposed coaxially with each other.

As shown in FIG. 3, the rib 106*b* projected at the outer peripheral surface of the ring portion 106*a* of the input gear 106 engages with the groove portion 104*a*1 of the through hole 104*a* of the intermediary member 104 shown in FIG. 5, so that a rotational driving force is transmitted from the input gear 106 to the intermediary member 104.

The ring portion 106*a* of the input gear 106 includes a large-diameter portion 106*a*1 into which the first output gear 101 is to be rotatably inserted. Further, the ring portion 106*a* includes a medium-diameter portion 106*a*2 into which the intermediary member 104 is to be rotatably inserted and a small-diameter portion 106*a*3 into which the second output gear is to be rotatably inserted.

The second output gear 102 is urged toward the input gear 106 by an urging force of a coil spring 108 as an urging means contacting a device frame 17. Then, the second output gear 102 contacts an abutment portion formed as a stepped portion between the small-diameter portion 106*a*3 and the medium-diameter portion 106*a*2 of the ring portion 106*a*, thus being positioned.

The intermediary member 104 includes a first ratchet tooth 104*c* having a first ratchet surface 104*c*1 for transmitting drive to the first output gear 101 in engagement with the first output gear 101 and a second ratchet surface 104*c*2 for moving the intermediary member 104 toward the second output gear 102 in an axial direction.

Further, the intermediary member 104 includes a second ratchet tooth 104*b*. The second ratchet tooth 104*b* has a third ratchet surface 104*b*1 for transmitting drive to the second output gear 102 in engagement with the second output gear 102. Further, the second ratchet tooth 104*b* has a fourth ratchet surface 104*b*2 for moving the intermediary member 104 toward the first output gear 101 in the axial direction.

Figure 6:
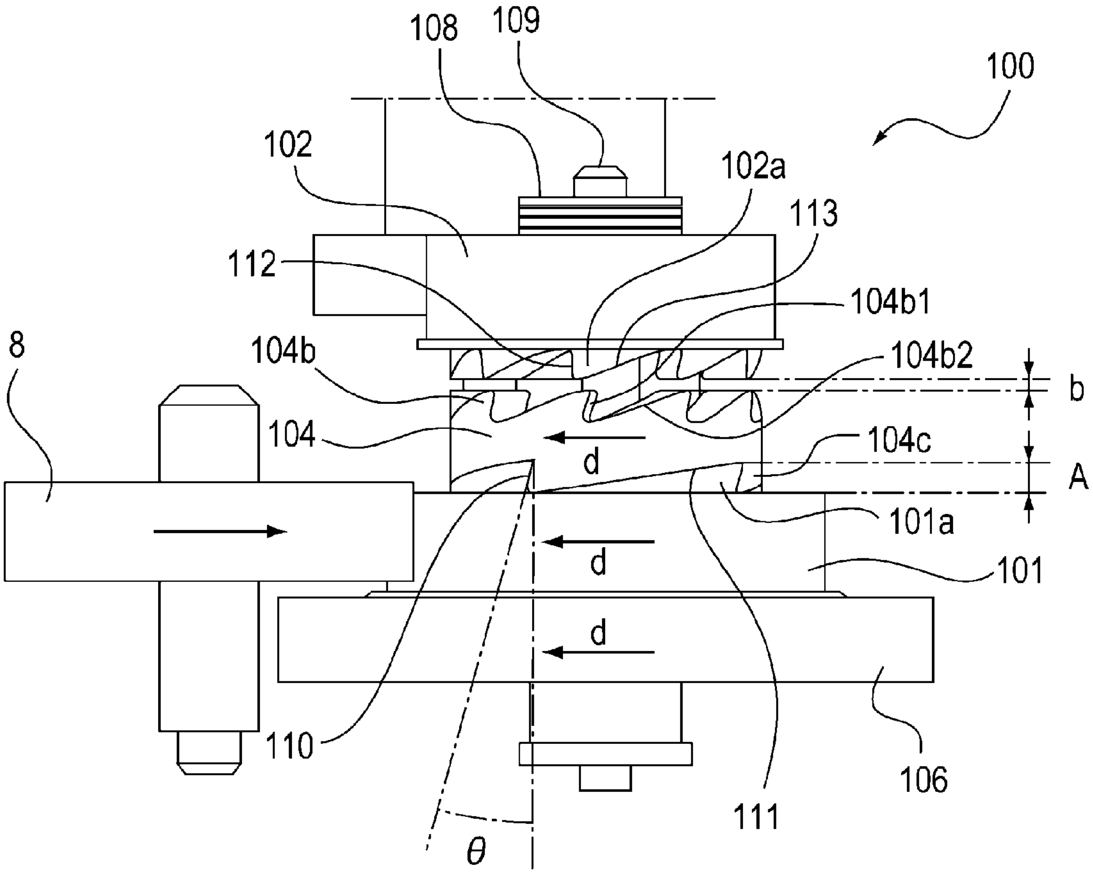
FIG. 6 is a side view for illustrating drive transmission when a driving source is normally rotated in the drive transmission device in Embodiment 1.
Figure 7:
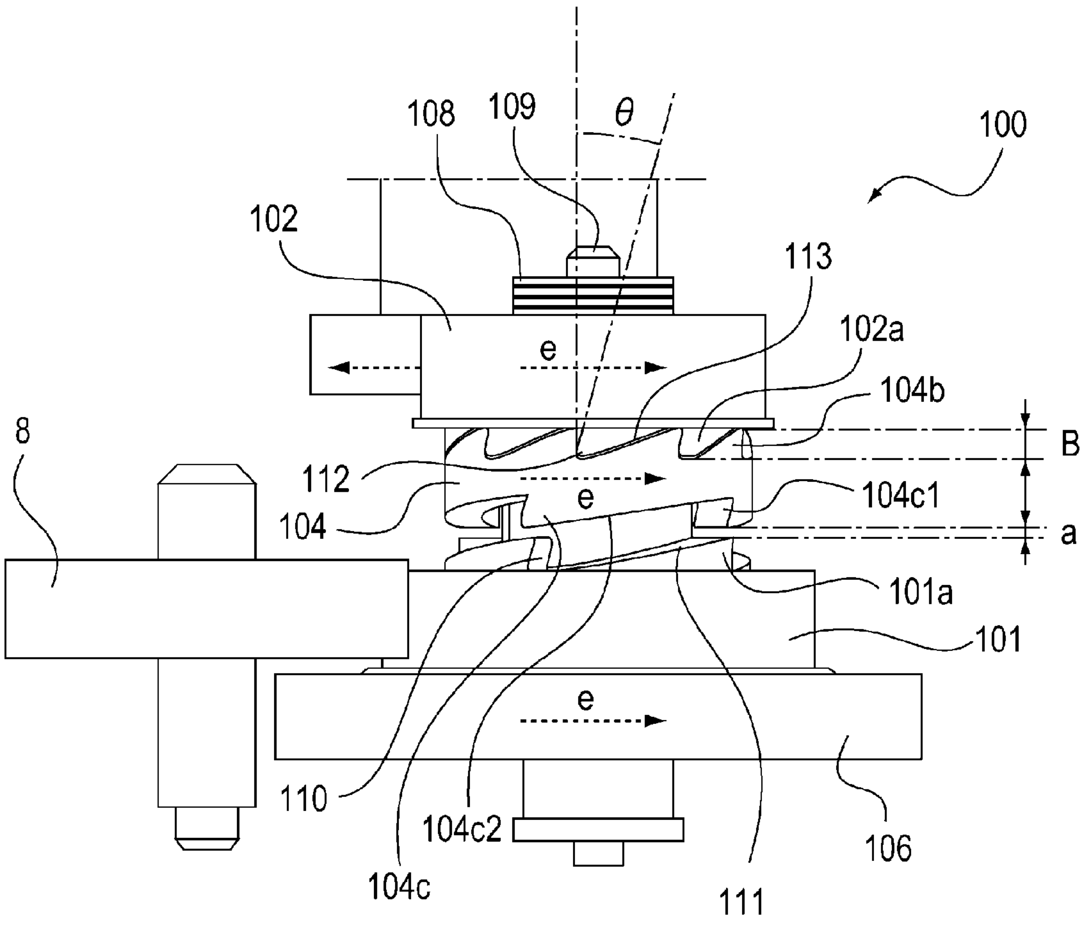
FIG. 7 is a side view for illustrating the drive transmission when the driving source is reversely rotated in the drive transmission device in Embodiment 1.
Figure 8:
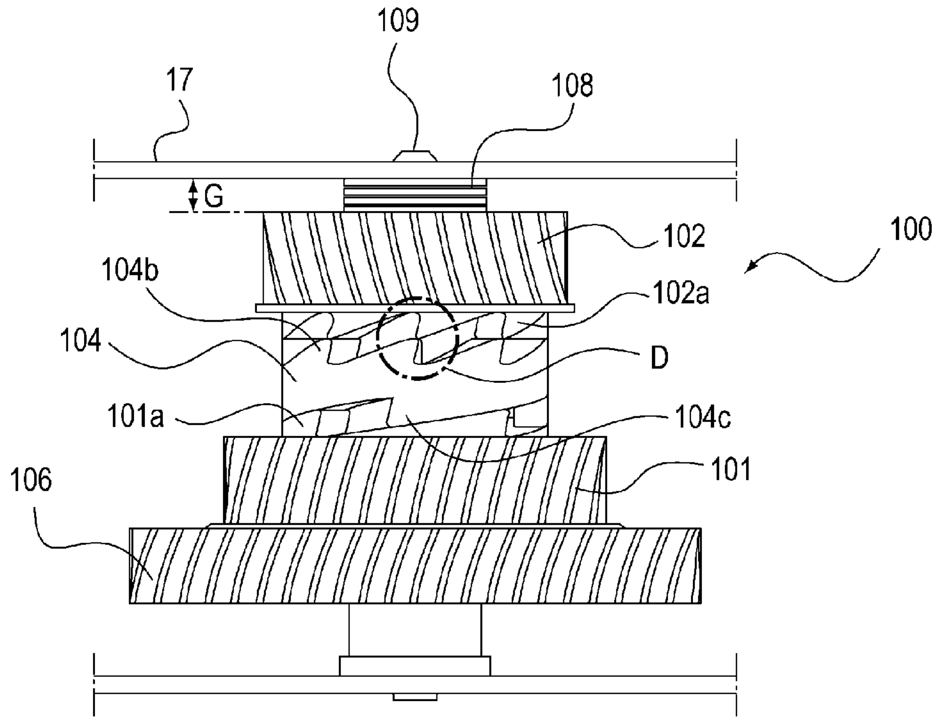
FIG. 8 is a side illustration showing a contact state between a tooth top of a ratchet tooth of the intermediary member and a tooth top of a ratchet tooth of first and second output gears in the drive transmission device in Embodiment 1.

As shown in FIGS. 6 and 7, the first ratchet surface 104*c*1 and the third ratchet surface 104*b*1 are constituted to provide a predetermined inclination angle θ with respect to the axial direction (vertical direction in FIGS. 6 and 7) so that a pulling-in force is generated during drive transmission.

The first output gear 101 is provided, in the intermediary member 104 side, with a ratchet tooth 101*a* correspondingly to the first ratchet tooth 104*c* provided with respect to the axial direction of the intermediary member 104. The ratchet tooth 101*a* has ratchet surfaces 110 and 111.

The second output gear 102 is provided, in the intermediary member 104 side, with a ratchet tooth 102*a* correspondingly to the second ratchet tooth 104*b* provided with respect to the axial direction of the intermediary member 104. The ratchet tooth 102*a* has ratchet surfaces 112 and 113.

The ratchet tooth means a gear which includes a sawtooth and which is constituted so as to rotate only in one direction in combination with a reverse rotation preventing claw as shown in FIGS. 3 to 9.

<Drive Transmission Path of Drive Transmission Device>

Next, a drive transmission path of the drive transmission device in this embodiment will be described with reference to FIGS. 2 and 5 to 7. As shown in FIG. 2, during printing of the image forming apparatus 600, the motor 22 as a single driving source in the drive transmission device 100 normally rotates in an arrow i direction (first direction) indicated by a solid line in FIG. 2.

The input gear 106 engaging with a driving gear 16 fixed on a driving shaft of the motor 22 rotates in an arrow d direction shown in FIG. 6. Then, the rib 106*b* provided on the ring portion 106*a* of the input gear 106 is engaged with and locked by the groove portion 104*a*1 provided at the inner peripheral surface of the intermediary member 104, so that the intermediary member 104 rotates integrally with the input gear 106 in the arrow d direction shown in FIG. 6. By the rotation of the intermediary member 104 in the arrow d direction, the fourth ratchet surface 104*b*2 for moving the intermediary member 104 toward the first output gear 101 along the supporting shaft 109 contacts and slides on the ratchet surface 113. As a result, the intermediary member 104 moves toward the first output gear 101 (first rotational axis direction) along the supporting shaft 109.

As a result, the first ratchet tooth 104*c* of the intermediary member 104 engages with the ratchet tooth 101*a* of the first output gear 101. Then, the first ratchet tooth 104*c*1 for transmitting drive from the intermediary member 104 to the first output gear 101 with respect to the rotational direction and the ratchet surface 110 engage with each other, so that the rotational driving force is transmitted from the intermediary member 104 to the first output gear 101.

As shown in FIG. 2, the rotational driving force is successively transmitted from the first output gear 101 to a further downstream gear train 24 via an idler gear 8 as shown in FIG. 2. Then, the rotational driving force from the gear train 24 is transmitted to a driving gear 18 fixed on a shaft of the pressing roller 604*b*, so that the pressing roller 604*b* is rotationally driven.

On the other hand, when a jam of the sheet S generates in the fixing nip N of the fixing device 604 of the image forming apparatus 600, a sheet sensor 19 as a sheet detecting means detects that the sheet S remains in the fixing nip N. Then, on the basis of detection information of the sheet sensor 19, the controller 605 reversely rotates the motor 22 in an arrow j direction (second direction) indicated by a broken line in FIG. 2.

The input gear 106 engaging with a driving gear 16 fixed on a driving shaft of the motor 22 rotates in an arrow e direction shown in FIG. 7. Then, the rib 106*b* provided on the ring portion 106*a* of the input gear 106 is engaged with and locked by the groove portion 104*a*1 provided at the inner peripheral surface of the intermediary member 104, so that the intermediary member 104 rotates integrally with the input gear 106 in the arrow e direction shown in FIG. 7.

By the rotation of the intermediary member 104 in the arrow e direction, the second ratchet surface 104*c*2 for moving the intermediary member 104 toward the second output gear 102 along the supporting shaft 109 contacts and slides on the ratchet surface 111. As a result, the intermediary member 104 moves toward the second output gear 102 (second rotational axis direction) along the supporting shaft 109.

As a result, as shown in FIG. 7, the second ratchet tooth 104*b* of the intermediary member 104 engages with the ratchet tooth 102*a* of the second output gear 102. Then, the third ratchet tooth 104*b*1 for transmitting drive from the intermediary member 104 to the second output gear 102 with respect to the rotational direction and the ratchet surface 112 engage with each other, so that the rotational driving force is transmitted from the intermediary member 104 to the second output gear 102.

As shown in FIG. 2, the rotational driving force is transmitted from the second output gear 102 to a driving gear 25 fixed on a cam shaft 27 of a fixing pressure releasing cam 26 via an idler gear 23, so that the fixing pressure releasing cam 26 is rotationally driven in an arrow n direction indicated by a broken line in FIG. 2.

A pressing arm 20 rotatable about an unshown pressing arm shaft is provided opposed to the fixing pressure releasing cam 26, and is urged toward the fixing pressure releasing cam 26 by a coil spring 21 as an urging means.

When the fixing pressure releasing cam 26 is rotationally driven in the arrow n direction indicated by the broken line in FIG. 2, an urging portion of the fixing pressure releasing cam 26 rotates the pressing arm 20 about the unshown pressing arm shaft against an urging force of the coil spring 21, and presses down the pressing arm 20 in a left direction in FIG. 2. As a result, the fixing roller 604*a* shaft-supported rotatably by the pressing arm 20 is spaced from the pressing roller 604*b*.

In this embodiment, a spacing sensor 28 as a detecting means for detecting a spacing state between the fixing roller 604*a* and the pressing roller 604*b* by detecting an angle of rotation of the fixing pressure releasing cam 26 is provided. Further, when the fixing pressure releasing cam 26 rotates about the cam shaft 27 to a predetermined angle, the spacing sensor 28 detects the spacing of the fixing roller (first rotatable member) 604*a* from the pressing roller (second rotatable member) 604*b*, and on the basis of detection information of the spacing sensor 28, the controller 605 stops the reverse rotation of the motor 22. By rotating the fixing pressure releasing cam 26 in the above-described manner, a contact pressure between the fixing roller 604*a* and the pressing roller 604*b* can be changed.

In the case where the jam of the sheet S generates in the fixing nip N of the fixing device 604 of the image forming apparatus 600, the controller 605 reversely rotates the motor 22 on the basis of the detection information of the sheet sensor 19, so that the fixing roller 604*a* is spaced from the pressing roller 604*b*. At this time, the contact pressure is zero. As a result, jam clearance of the sheet S jammed in the fixing nip N of the fixing device 604 can be easily performed.

When the jam clearance of the sheet S jammed in the fixing nip N is performed, the sheet sensor 19 detects that there is no sheet S in the fixing nip N. On the basis of detection information of the sheet sensor 19, the controller 605 reversely rotates the motor 22 further in the arrow j direction indicated by the broken line in FIG. 2 and rotates the fixing pressure releasing cam 26 further in the arrow n direction in FIG. 2. As a result, the urging portion of the fixing pressure releasing cam 26 separates from the pressing arm 20. For this reason, the pressing arm 20 is urged by the coil spring 21 to rotate about the pressing arm shaft, so that the fixing roller 604*a* is press-contacted to the pressing roller 604*b* to return the fixing nip N to a pressed state.

FIGS. 6 and 7 illustrate switching between normal rotation and reverse rotation of the single motor 22 in the image forming apparatus 600 in this embodiment. As a result, FIGS. 6 and 7 show a state in which the rotational drive of the pressing roller 604*b* and a contact and separation (spacing) operation for moving the fixing roller 604*a* toward and away from the pressing roller 604*b* are selectively switched.

In FIGS. 6 and 7, for simplification, a tooth surface shape is omitted from illustration. FIG. 6 is a side illustration showing an operation of the drive transmission device 100 when the motor 22 is normally rotated, and FIG. 7 is a side illustration showing an operation of the drive transmission device when the motor 22 is reversely rotated.

When the motor 22 normally rotates in the arrow i direction indicated by the solid line in FIG. 2, the input gear 106 engaging with the driving gear 16 fixed on the driving shaft of the motor 22 rotates in the arrow d direction indicated by the solid line in FIG. 6. The rib 106*b* projected at the outer peripheral surface of the medium-diameter portion 106*a*2 of the ring portion 106*a* provided integrally with the input gear 106 engages with the groove portion 105*a*1 formed at the inner peripheral surface of the intermediary member 104. Then, a rotational force of the input gear 106 is transmitted to the intermediary member 104, so that the intermediary member 104 rotates in the arrow d direction, indicated by the solid line in FIG. 6, which is the same direction as the rotational direction of the input gear 106.

The intermediary member 104 rotates in the arrow d direction in FIG. 6. Then, the ratchet surface 104*b*2 of the ratchet tooth 104*b* provided at an upper portion of the intermediary member 104 in FIG. 6 contacts and slides on the ratchet surface 113 of the ratchet tooth 102*a* of the second output gear 102. As a result, the intermediary member 104 moves toward the first output gear 101 (first rotational axis direction) along the supporting shaft 109 via the second output gear 102.

The ratchet surface 104*b*2 of the ratchet tooth 104*b* of the intermediary member 104 contacts and slides on the ratchet surface 113 of the ratchet tooth 102*a* of the second output gear 102. At that time, in order to prevent the second output gear 102 from rotating together with the intermediary member 104, in a downstream side of the second output gear 102, the driving gear 25 fixed on the cam shaft 27 of the fixing pressure releasing cam 26 is connected with the second output gear 102 via the idler gear 23. As a result, a rotational resistance is given, so that the second output gear 102 is constituted so as not to rotate together with the intermediary member 104.

Between the ratchet surface 110 of the ratchet tooth 101*a* of the first output gear 101 and the ratchet surface 104*c*1 of the ratchet tooth 104*c* of the intermediary member 104, the predetermined inclination angle θ is provided so that the pulling-in force generates during the drive transmission. As a result, when the ratchet surface 104*c*1 of the ratchet tooth 104*c* of the intermediary member 104 and the ratchet surface 110 of the ratchet tooth 101*a* of the first output gear 101 start engagement therebetween, the first output gear 101 and the intermediary member 104 pull in each other in the axial direction.

For this reason, in a stage in which the intermediary member 104 contacts the first output gear 101 with respect to the axial direction (vertical direction in FIG. 6), as shown in FIG. 6, the intermediary member 104 and the second output gear 102 are set at a positional relationship such that a spacing (gap) b is formed with respect to the axial direction (vertical direction in FIG. 6).

On the other hand, when the motor 22 reversely rotates in the arrow j direction indicated by the broken line in FIG. 2, the input gear 106 engaging with the driving gear 16 fixed on the driving shaft of the motor 22 rotates in an arrow e direction indicated by the broken line in FIG. 7. The rib 106*b* projected at the outer peripheral surface of the medium-diameter portion 106*a*2 of the ring portion 106*a* provided integrally with the input gear 106 engages with the groove portion 104*a*1 formed at the inner peripheral surface of the intermediary member 104. Then, a rotational force of the input gear 106 is transmitted to the intermediary member 104, so that the intermediary member 104 rotates in the arrow e direction, indicated by the broken line in FIG. 7, which is the same direction as the rotational direction of the input gear 106.

When the intermediary member 104 rotates in the arrow d direction in FIG. 7, the ratchet surface 104*c*2 of the ratchet tooth 104*c* provided at a lower portion of the intermediary member 104 in FIG. 7 contacts and slides on the ratchet surface 111 of the ratchet tooth 101*a* of the first output gear 101. As a result, the intermediary member 104 moves toward the second output gear 102 (second rotational axis direction) along the supporting shaft 109 via the second output gear 102.

The ratchet surface 104*c*2 of the ratchet tooth 104*c* of the intermediary member 104 contacts and slides on the ratchet surface 111 of the ratchet tooth 101*a* of the first output gear 101. At that time, in order to prevent the first output gear 101 from rotating together with the intermediary member 104, in a downstream side of the first output gear 101, the driving gear 18 fixed on the shaft of the pressing roller 604*b* is connected with the first output gear 101 via the idler gear 8 and the gear train 24. As a result, a rotational resistance is given, so that the first output gear 101 is constituted so as not to rotate together with the intermediary member 104.

Between the ratchet surface 112 of the ratchet tooth 102*a* of the second output gear 102 and the ratchet surface 104*b*1 of the ratchet tooth 104*b* of the intermediary member 104, the predetermined inclination angle θ is provided so that the pulling-in force generates during the drive transmission. As a result, when the ratchet surface 104*b*1 of the ratchet tooth 104*b* of the intermediary member 104 and the ratchet surface 112 of the ratchet tooth 102*a* of the second output gear 102 start engagement therebetween, the second output gear 102 and the intermediary member 104 pull in each other in the axial direction.

For this reason, in a stage in which the intermediary member 104 contacts the second output gear 102 with respect to the axial direction (vertical direction in FIG. 7), as shown in FIG. 7, the intermediary member 104 and the first output gear 101 are set at a positional relationship such that a spacing (gap) a is formed with respect to the axial direction (vertical direction in FIG. 7).

That is, as shown in FIG. 6, an engagement amount between the intermediary member 104 and the first output gear 101 during the drive transmission is A, and the spacing between the intermediary member 104 and the second output gear 102 in a state in which the drive is transmitted from the intermediary member 104 to the first output gear 101 is b.

Further, as shown in FIG. 7, an engagement amount between the intermediary member 104 and the second output gear 102 during the drive transmission is B, and the spacing between the intermediary member 104 and the first output gear 101 in a state in which the drive is transmitted from the intermediary member 104 to the second output gear 102 is a. In the case, these values are set to satisfy the following relationships:

A>b and B>a.

However, depending on phase timing between the first output gear 101 and the second output gear 102, the following case generates. As shown by a portion D in FIG. 8, the intermediary member 104 starts upward movement in the axial direction (vertical direction in FIG. 8). At that time, a tooth top of the ratchet tooth 102*a* of the second output gear 102 and a tooth top of the ratchet tooth 104*b* of the intermediary member 104 about against each other. Then, the case where the intermediary member 104 cannot completely move upwardly in the axial direction (vertical direction in FIG. 8) generates.

Therefore, a spacing (gap) G is provided between the second output gear 102 and the device frame 17 in a side opposite from the first output gear 101 so that the second output gear 102 can move from a position (predetermined position), where the second output gear 102 abuts against the abutment portion 114, in the second rotational axis direction (direction in which the second output gear 102 moves away from the first output gear 101). As a result, when the tooth top of the ratchet tooth 102*a* and the tooth top of the ratchet tooth 104*b* of the intermediary member 104 abut against each other, the second output gear 102 urged by the intermediary member 104 moves upwardly, so that the tooth tops of the second output gear 102 and the intermediary member 104 can be spaced from each other.

The second output gear 102 is urged toward a lower side in the axial direction (vertical direction in FIG. 4) by the coil spring 108 as an urging means so that the engagement A and the spacing b shown in FIG. 6 can satisfy the above-described relationship even when the spacing G described above is provided. In a normal state of use, as shown in FIG. 4, an inner peripheral end portion of the second output gear 102 abuts against the abutment portion 114, which is the stepped portion between the small-diameter portion 106*a*3 and the medium-diameter portion 106*a*2 of the ring portion 106*a* provided integrally with the input gear 106, with respect to the axial direction (vertical direction in FIG. 4).

Further, the case where the number of teeth of the ratchet tooth 101*a* of the first output gear 101 and the number of teeth of the ratchet tooth 102*a* of the second output gear 102 are the same can occur. In that case, depending on phase timing between the first output gear 101 and the second gear 102, the intermediary member 104 moves downwardly in FIG. 4 by its own weight before engaging with the second output gear 102. As a result, in some cases, the drive cannot be transmitted from the intermediary member 104 to the second output gear 102.

Figure 9:
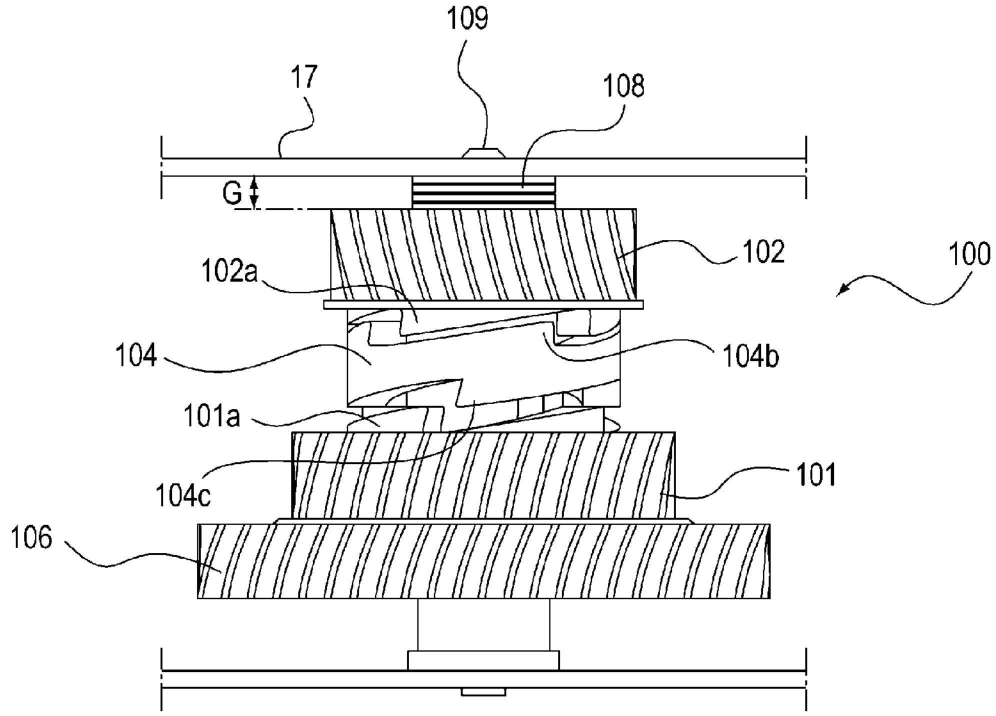
FIG. 9 is a side illustration showing a state in which the number of teeth of ratchet teeth of the intermediary member and the number of teeth of ratchet teeth of each of the first and second output gear are the same in the drive transmission device in Embodiment 1.

In order to eliminate such a problem, it would be considered that the intermediary member 104 is rotated at a speed higher than a rotational speed where the intermediary member 104 moves downwardly in FIG. 9 by gravitation. Further, another method which does not depend on the rotational speed of the intermediary member 104 exists. The number of teeth of the first ratchet tooth 104*c* of the intermediary member 104 for transmitting the drive to the first output gear 101 in engagement with the ratchet tooth 101*a* of the first output gear 101 is 4 (teeth). Further, the number of teeth of the second ratchet tooth 104*b* of the intermediary member 104 for transmitting the drive to the second output gear 102 in engagement with the ratchet tooth 102*a* of the second output gear 102 is 9 (teeth). That is, the number of teeth of the first ratchet tooth 104*c* of the intermediary member 104 and the number of teeth of the second ratchet tooth 104*b* of the intermediary member 104 may only be required to be set to satisfy a relationship such that a ratio therebetween is a non-integer ratio.

Further, in the case where a sensor such that the sensor is capable of detecting the phase of each of the first output gear 101 and the second output gear 102 is provided, timing when the motor 22 is rotated normally or reversely may also be changed on the basis of a detection result of the phase of each of the first output gear 101 and the second output gear 102.

As described above, the intermediary member 104 moves in the axial direction of the supporting shaft 109 depending on the normal or reverse rotation of the motor 22, so that the intermediary member 104 can transmit the drive to the first output gear 101 or the second output gear 102 in engagement with the first output gear 101 or the second output gear 102. As a result, a simple constitution can be realized by a smaller number of parts, and noise generating when the ratchet teeth 101*a*, 102*a*, 104*b* and 104*c* of the first output gear 101, the second output gear 102 and the intermediary member 104 engage with each other can be reduced.

By using the plurality of ratchet teeth for one-directional drive transmission of the rotational drive of the motor 22, high-torque drive transmission can be made. Further, the ratchet teeth are provided on the front and back surfaces of the intermediary member 104, drive switching can be made using small-sized parts, so that a compact drive transmission device 100 can be realized.

The drive transmission device 100 in this embodiment switches the normal rotation and the reverse rotation of the single motor 22. As a result, an example of the case where the rotational drive of the pressing roller 604*b* of the fixing device 604 and the contact and separation operation for moving the fixing roller 604*a* toward and away from the pressing roller 604*b* are selectively switched was described. The present invention is similarly applicable to other various uses in which the drive transmission is switched by the normal rotation and the reverse rotation of the single motor in a multi-stage sheet feeding device, a rotary developing device and the like in the image forming apparatus 600.

Embodiment 2

Figure 10:
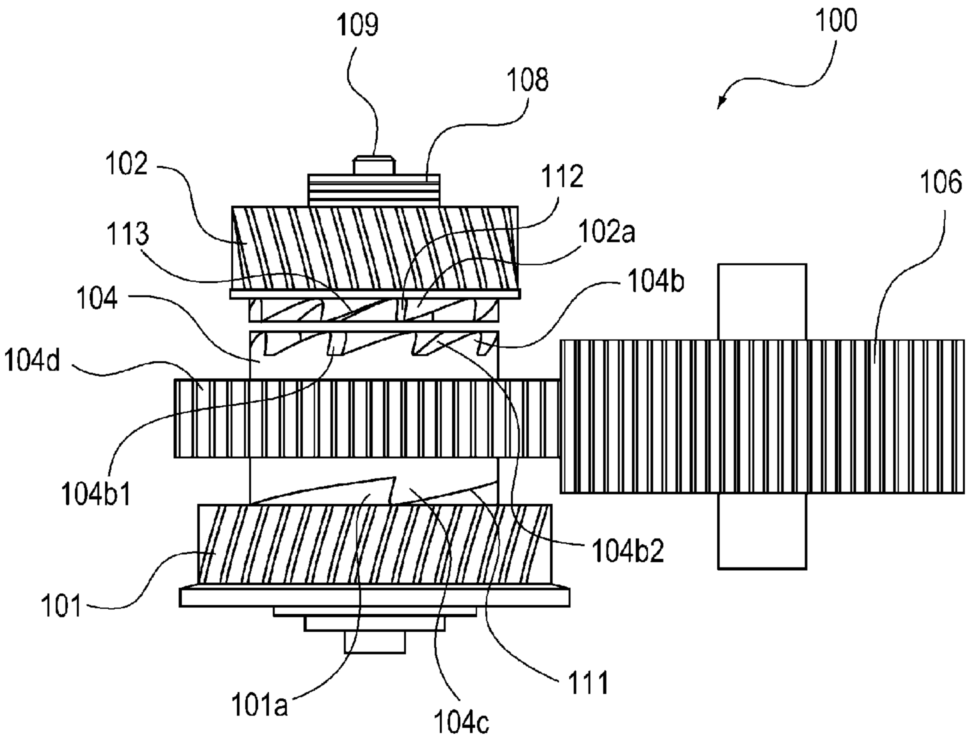
FIG. 10 is a side illustration showing a structure of a drive transmission device according to the present invention in Embodiment 1.
Figure 11:
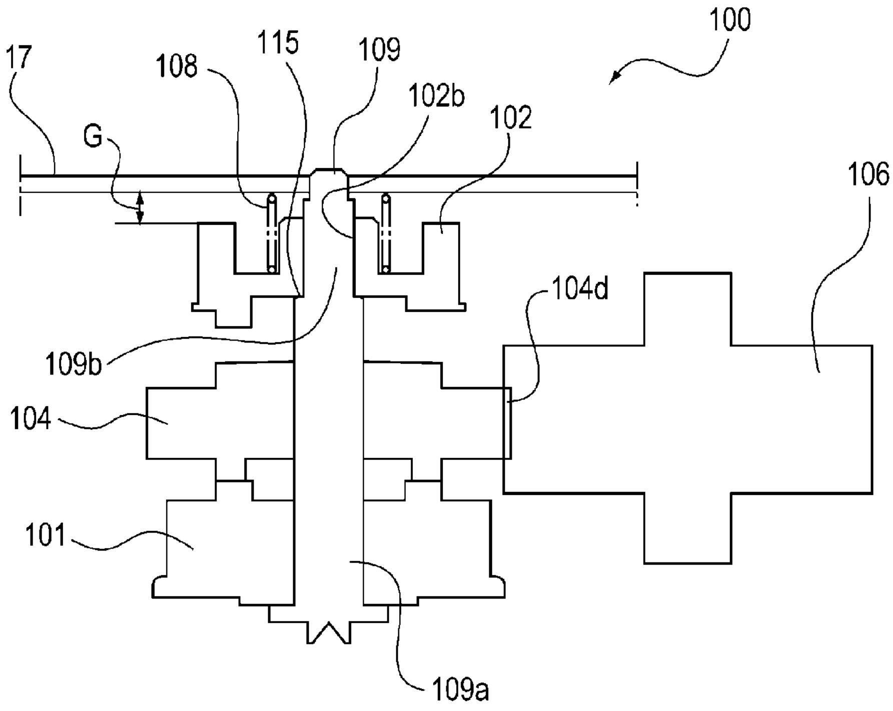
FIG. 11 is a sectional illustration showing the structure of the drive transmission device in Embodiment 2.

Embodiment 2 of an image forming apparatus including a drive transmission device according to the present invention will be described with reference to FIGS. 10 and 11. Constituent elements similar to those in Embodiment 1 will be omitted from illustration by adding the same reference numerals or symbols or adding the same member names even when the reference numerals or symbols are different. FIG. 10 is a side illustration showing a structure of the drive transmission device in this embodiment. FIG. 11 is a sectional illustration showing the structure of the drive transmission device in this embodiment.

In Embodiment 1, as an example of the constitution in which the rotational driving force is transmitted from the input gear 106 to the intermediary member 104, the following constitution was employed. The rib 106*b* projected at the outer peripheral surface of the medium-diameter portion 106*a*2 of the ring portion 106*a* provided integrally with the input gear 106 as shown in FIG. 3 and the groove portion 104*a*1 provided at the inner peripheral surface of the intermediary member 104 as shown in FIG. 5 engage with each other. As a result, the rotational driving force is transmitted from the input gear 106 to the intermediary member 104. Such a constitution was employed.

In this embodiment, as shown in FIG. 10, a constitution in which a spur gear 104*d* engaging with the input gear 106 constituted by a spur gear at the outer peripheral surface of the intermediary member 104 is provided is employed. As a result, a constitution in which the rotational driving force is transmitted in the substantially same manner as in Embodiment 1 except that the rotational driving force from the input gear 106 is received by the spur gear 104*d* of the intermediary member 104 is employed.

The first output gear 101, the second output gear 102 and the intermediary member 104 in this embodiment are directly shaft-supported rotatably by the supporting shaft 109. The input gear 106 is provided rotatably on a shaft different from the supporting shaft 109. The first output gear 101 and the intermediary member 104 are rotatably shaft-supported by the large-diameter portion 109*a* of the supporting shaft 109, and the second output gear 102 is rotatably shaft-supported by the small-diameter portion 109*b* of the supporting shaft 109.

The end portion of the second output gear 102 at the inner peripheral surface of the second output gear 102 contacts the abutment portion 115 which is a stepped portion between the large-diameter portion 109*a* and the small-diameter portion 109*b*, and one end of the second output gear 102 is urged toward the intermediary member 104 by the coil spring 108 as an urging means contacted to the device frame 17.

In this embodiment, the input gear 106 was disposed on the shaft different from the supporting shaft 109. As a result, an entire thickness (vertical width (length) in FIG. 11) of the drive transmission device 100 including the first gear 101, the second output gear 102 and the intermediary member 104 can be made thin with respect to the direction of the supporting shaft 109. As a result, the drive transmission device 100 can be disposed also in a narrow space in the apparatus main assembly.

In this embodiment, as shown in FIG. 10, the constitution in which the spur gear 104*d* is provided at the outer peripheral surface of the intermediary member 104 is employed, but a helical gear such that a force directed in the axial direction is generated or the like gear may also be used. The helical gear is constituted by an inclined gear formed, as shown by the input gear 106, the first output gear 101, the second output gear 102 and the like in Embodiment 1, in a helical shape when being extended in the rotational axis direction, so that an axial direction force (thrust force) is generated. A tooth abutment portion is distributed, and therefore the helical gear is more silent than the spur gear.

In the case where the helical gear is provided at the outer peripheral surface of the intermediary member 104, the following constitution is employed. A direction in which the intermediary member 104 contacts and slides on the ratchet surfaces 111 and 113 of the first output gear 101 and the second output gear 102 to move in the axial direction and a direction of the axial direction force generated by a helix angle of the helical gear are aligned with each other. Other constitutions are similar to those in Embodiment 1, and a similar effect can be obtained.

Embodiment 3

Figure 12:
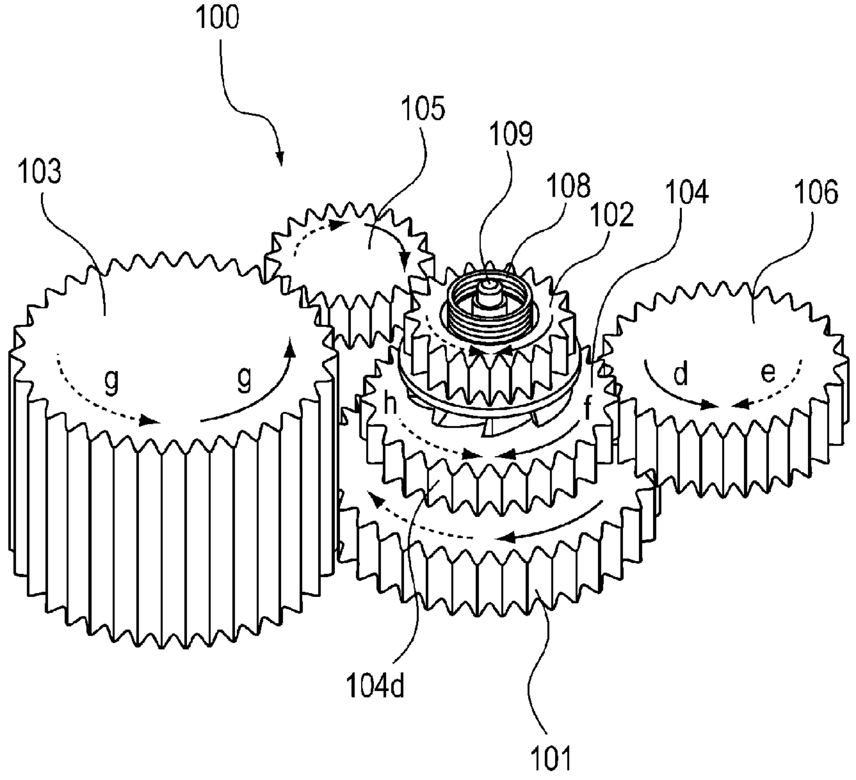
FIG. 12 is a perspective illustration showing a structure of a drive transmission device according to the present invention in Embodiment 3.
Figure 13:
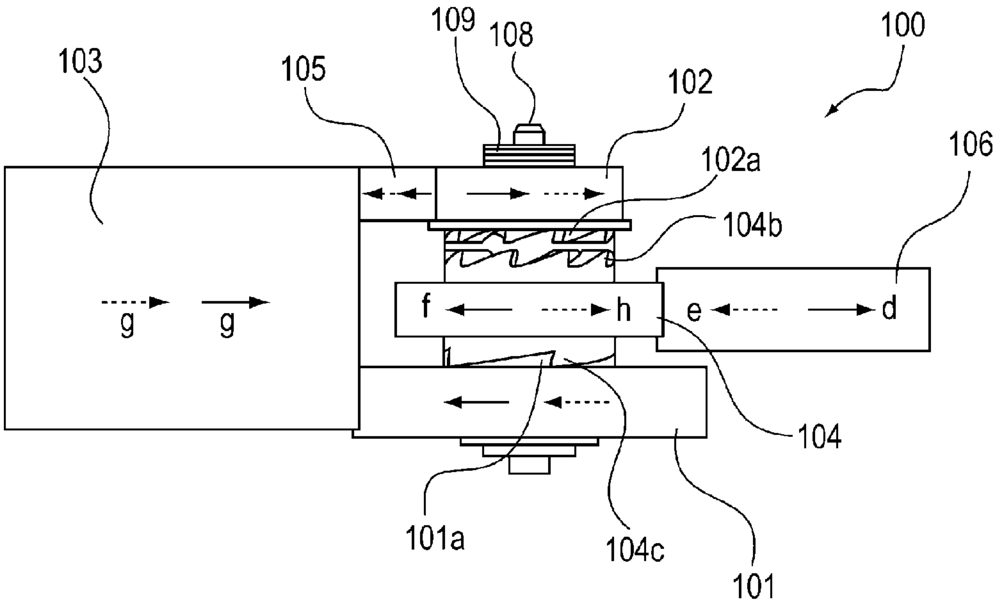
FIG. 13 is a side view for illustrating drive transmission when a driving source is rotated normally and reversely in the drive transmission device in Embodiment 3.

Embodiment 3 of an image forming apparatus including a drive transmission device according to the present invention will be described with reference to FIGS. 12 and 13. Constituent elements similar to those in Embodiments 1 and 2 will be omitted from illustration by adding the same reference numerals or symbols or adding the same member names even when the reference numerals or symbols are different. FIG. 12 is a perspective illustration showing a structure of the drive transmission device in this embodiment. FIG. 13 is a side illustration showing the structure of the drive transmission device in this embodiment. For simplification, a tooth surface shape in FIG. 13 will be omitted from illustration.

In this embodiment, a third output gear 103 as a final output portion rotates in the same direction when the motor 22 as the driving source rotates normally and reversely. Further, a constitution in which a reduction ratio from the first output gear 101 to the third output gear 103 as the final output portion is switched by the normal rotation and the reverse rotation so that the number of rotation of the third output gear 103 is different between the normal rotation and the reverse rotation is employed.

In this embodiment, in FIG. 12, the number of teeth of the first output gear 101 is 40 (teeth), the number of teeth of the third output gear 103 is 40 (teeth), the number of teeth of the second output gear 102 is 20 (teeth), and the number of teeth of the idler gear 105 is 20 (teeth). The number of rotation of the intermediary member 104 is 1000 rpm (rotation per minute) with respect to each of the normal rotation and the reverse rotation.

The motor 22 normally rotates in the arrow i direction indicated by the solid line in FIG. 2, and the input gear 106 normally rotates in the arrow d direction indicated by the solid line in FIGS. 12 and 13 via the driving gear 16 fixed on the driving shaft of the motor 22. Further, the intermediary member 104 normally rotates in an arrow f direction indicated by the solid line in FIGS. 12 and 13 via the spur gear 104*d* engaging with the input gear 106.

In the case where the motor 22 normally rotates, the rotational driving force is transmitted from the ratchet tooth 104*c* of the intermediary member 104 to the ratchet tooth 101*a* of the first output gear 101. Then, the third output gear 103 engaging with the first output gear 101 rotates at 1000 rpm in an arrow g direction indicated by a solid line in FIGS. 12 and 13.

Further, the rotational driving force is also transmitted to the second output gear 102 via the idler gear 105 engaging with the third output gear 103.

That is, in this embodiment, a first drive transmission path from the first output gear 101 to the third output gear 103 as the final output portion is constituted by engagement between the first gear 101 and the third output gear 103. Further, a second drive transmission path from the second output gear 102 to the third output gear 103 as the final output portion is constituted by engagement among the second input gear 102, the idler gear 105 and the third output gear 103.

In the case where the motor 22 normally rotates, the second output gear 102 is rotationally driven by transmitting the rotational driving force in the order of the input gear 106, the intermediary member 104, the first output gear 101, the third output gear 103, the idler gear 105 and the second output gear 102. At this time, as shown in FIG. 13, the intermediary member 104 moves toward the first output gear 101 along the supporting shaft 109, so that the ratchet tooth 104*b* of the intermediary member 104 and the ratchet tooth 102*a* of the second output gear 102 do not contact each other.

On the other hand, the motor 22 reversely rotates in the arrow j direction indicated by the broken line in FIG. 2, and the input gear 106 reversely rotates in the arrow e direction indicated by the broken line in FIGS. 12 and 13 via the driving gear 16 fixed on the driving shaft of the motor 22. Further, the intermediary member 104 reversely rotates in an arrow h direction indicated by the broken line in FIGS. 12 and 13 via the spur gear 104*d* engaging with the input gear 106.

In the case where the motor 22 reversely rotates, the rotational driving force is transmitted from the ratchet tooth 104*b* of the intermediary member 104 to the ratchet tooth 102*a* of the second output gear 102. Then, the third output gear 103 engaging with the second output gear 102 via the idler gear 105 rotates at 500 rpm in the arrow g direction indicated by a broken line in FIGS. 12 and 13.

Further, the rotational driving force is also transmitted to the first output gear 101 engaging with the third output gear 103.

In the case where the motor 22 reversely rotates, the first output gear 101 is rotationally driven by transmitting the rotational driving force in the order of the input gear 106, the intermediary member 104, the second output gear 102, the idler gear 105, the third output gear 103 and the first output gear 101. At this time, as shown in FIG. 13, the intermediary member 104 moves toward the second output gear 102 along the supporting shaft 109, so that the ratchet tooth 104*c* of the intermediary member 104 and the ratchet tooth 101*a* of the first output gear 101 do not contact each other.

In this embodiment, when the intermediary member 104 is rotationally driven at 1000 rpm by the normal rotation in the arrow f direction indicated by the solid line in FIGS. 12 and 13, the third output gear 103 rotates at 1000 rpm in the arrow g direction indicated by the solid line.

On the other hand, when the intermediary member 104 is rotationally driven at 1000 rpm by the reverse rotation in the arrow h direction indicated by the broken line in FIGS. 12 and 13, the third output gear 103 rotates at 500 rpm in the arrow g direction indicated by the broken line in FIGS. 12 and 13. This is based on setting of the number of teeth such that the number of teeth of the first output gear 101 is 40 (teeth) and the number of teeth of each of the second output gear 102 and the idler gear 105 is 20 (teeth).

As a result, by a simple constitution, the drive transmission device 100 capable of switching the reduction ratio by the normal rotation and the reverse rotation of the motor 22 can be realized. Other constitutions are similar to those in Embodiments 1 and 2, and a similar effect can also be obtained.

In the above-described embodiments, an example in which the drive transmission device 100 is applied to various drive transmission portions of the image forming apparatus 600 was described, but can also be applied to drive transmission portions of various apparatuses (devices) other than the image forming apparatus 600.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 013088/2014 filed Jan. 28, 2014, which is hereby incorporated by reference.

What is claimed is:

1. A drive transmission device comprising:

a first output gear and a second output gear which are rotatable about the same rotational axis; and a single intermediary member to be rotated about the rotational axis by a driving source, wherein said intermediary member is provided between said first output gear and said second output gear with respect to an axial direction of the rotational axis, wherein said intermediary member moves in a first axial direction of the rotational axis to rotate in engagement with said first output gear when the driving source rotates in a first direction, and moves in a second axial direction of the rotational axis opposite to the first axial direction to rotate in engagement with said second output gear when the driving source rotates in a second direction opposite to the first direction, and wherein said intermediary member includes a first ratchet tooth having a first ratchet surface for transmitting drive to said first output gear and a second ratchet surface for moving said intermediary member toward said second output gear, and includes a second ratchet tooth having a third ratchet surface for transmitting drive to said second output gear and a fourth ratchet surface for moving said intermediary member toward said first output gear.

2. A drive transmission device according to claim 1, wherein each of the first ratchet surface and the third ratchet surface has a predetermined inclination angle with respect to an axial direction of said intermediary member so as to generate a pulling-in force during drive transmission.

3. A drive transmission device according to claim 1, wherein when an engagement amount between said intermediary member and said first output gear during drive transmission is A, a spacing between said intermediary member and said second output gear in a state in which drive is transmitted to said first output gear is b, an engagement amount between said intermediary member and said second output gear during drive transmission is B, and a spacing between said intermediary member and said first output gear in a state in which drive is transmitted to said first output gear is a, the following relationship is satisfied:

$$A>b \text{ and } B>a.$$

4. A drive transmission device according to claim 1, wherein a ratio between the number of teeth of the first ratchet tooth of said intermediary member for transmitting the drive to said first output gear and the number of teeth of the second ratchet tooth of said intermediary member for transmitting the drive to said second output gear is a non-integer ratio.

5. A drive transmission device according to claim 1, further comprising:

an input gear for transmitting rotational drive from the driving source to said intermediary member, wherein said input gear, said first output gear, said intermediary member and said second output gear are coaxially provided.

6. A drive transmission device according to claim 5, wherein said intermediary member includes a gear engaging with said input gear.

7. A drive transmission device according to claim 1, wherein said second output gear is urged toward a predetermined position with respect to the axial direction of the rotational axis, and is movable from the predetermined position in the axial direction of the rotational axis against an urging force.

8. A drive transmission device according to claim 1, further comprising:

a driven member rotatable by rotation of said first output gear and by rotation of said second output gear, wherein said driven member is rotated in the same direction when being rotated by the rotation of said first output gear and when being rotated by the rotational of said second output gear, and wherein said driven member is different in number of rotations between when being rotated by the rotation of said first output gear and when being rotated by the rotation of said second output gear.

9. An image forming apparatus for forming a toner image on a sheet, comprising:

a drive transmission device including:

a first output gear and a second output gear which are rotatable about the same rotational axis; and a single intermediary member to be rotated about the rotational axis by a driving source, wherein said intermediary member is provided between said first output gear and said second output gear with respect to an axial direction of the rotational axis, wherein said intermediary member moves in a first axial direction of the rotational axis to rotate in engagement with said first output gear when the driving source rotates in a first direction, and moves in a second axial direction of the rotational axis opposite to the first axial direction to rotate in engagement with said second output gear when the driving source rotates in a second direction opposite to the first direction, and wherein said intermediary member includes a first ratchet tooth having a first ratchet surface for transmitting drive to said first output gear and a second ratchet surface for moving said intermediary member toward said second output gear, and includes a second ratchet tooth having a third ratchet surface for transmitting drive to said second output gear and a fourth ratchet surface for moving said intermediary member toward said first output gear.

10. An image forming apparatus according to claim 9, wherein each of the first ratchet surface and the third ratchet surface has a predetermined inclination angle with respect to an axial direction of said intermediary member so as to generate a pulling-in force during drive transmission.

11. An image forming apparatus according to claim 9, wherein when an engagement amount between said intermediary member and said first output gear during drive transmission is A, a spacing between said intermediary member and said second output gear in a state in which drive is transmitted to said first output gear is b, an engagement amount between said intermediary member and said second output gear during drive transmission is B, and a spacing between said intermediary member and said first output gear in a state in which drive is transmitted to said first output gear is a, the following relationship is satisfied:

$$A>b \text{ and } B>a.$$

12. An image forming apparatus according to claim 9, wherein a ratio between the number of teeth of the first ratchet tooth of said intermediary member for transmitting the drive to said first output gear and the number of teeth of the second ratchet tooth of said intermediary member for transmitting the drive to said second output gear is a non-integer ratio.

13. An image forming apparatus according to claim 9, further comprising:

an input gear for transmitting rotational drive from the driving source to said intermediary member, wherein said input gear, said first output gear, said intermediary member and said second output gear are coaxially provided.

14. An image forming apparatus according to claim 13, wherein said intermediary member includes a gear engaging with said input gear.

15. An image forming apparatus according to claim 9, wherein said second output gear is urged toward a predetermined position with respect to the axial direction of the rotational axis, and is movable from the predetermined position in the axial direction of the rotational axis against an urging force.

16. An image forming apparatus according to claim 9, further comprising:

a driven member rotatable by rotation of said first output gear and by rotation of said second output gear, wherein said driven member is rotated in the same direction when being rotated by the rotation of said first output gear and when being rotated by the rotational of said second output gear, and wherein said driven member is different in number of rotations between when being rotated by the rotation of said first output gear and when being rotated by the rotation of said second output gear.

17. An image forming apparatus according to claim 9, further comprising:

a fixing unit for fixing the toner image on the sheet, wherein said fixing unit includes a first rotatable member and a second rotatable member which form a nip in which the sheet is heated and pressed, wherein the second rotatable member is rotated by the rotational of said first output gear, and a contact pressure between the first rotatable member and the second rotatable member is changed by the rotation of said second output gear.

* * * * *